May 30, 1961     J. G. DUFFY, JR     2,986,509
FUEL ELEMENT FOR A NUCLEAR REACTOR
Filed April 25, 1957     2 Sheets-Sheet 1
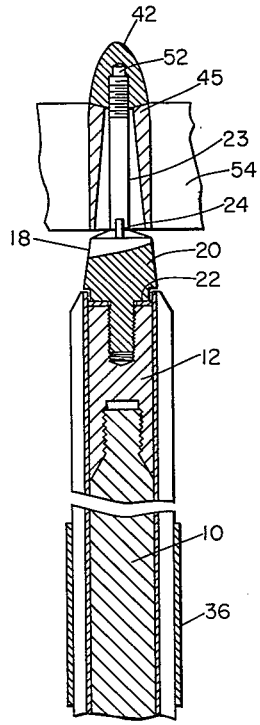
Fig 1
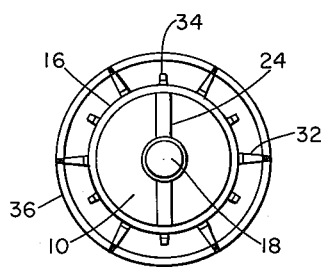
Fig 2
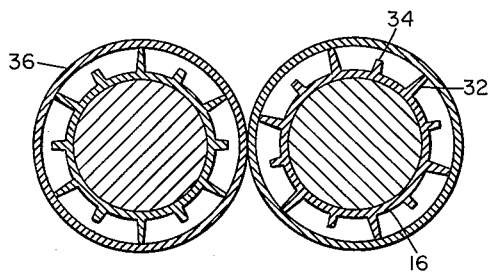
Fig 4
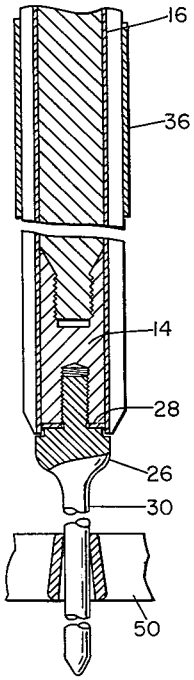
INVENTOR.
JAMES G. DUFFY, JR.
BY

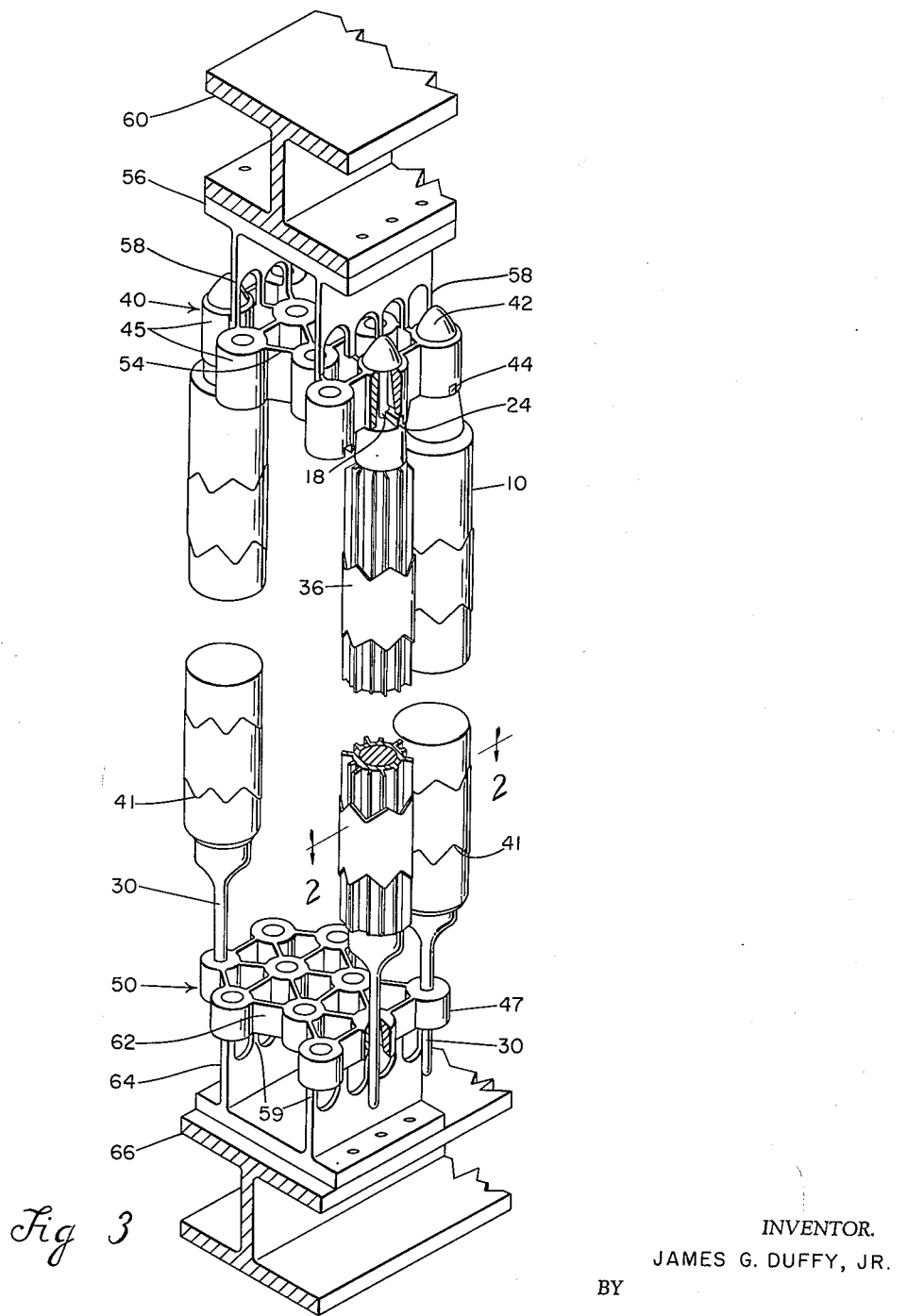

2,986,509
FUEL ELEMENT FOR A NUCLEAR REACTOR

James G. Duffy, Jr., Ossining, N.Y., assignor to the United States of America as represented by the United States Atomic Energy Commission Filed Apr. 25, 1957, Ser. No. 655,162

5 Claims. (Cl. 204—193.2)

The present invention relates to an improved fuel element for a nuclear reactor.

A nuclear reactor generally contains a quantity of fuel elements containing a fissionable material and distributed through a matrix of a moderating substance such as heavy or light water or graphite. The present fuel element is adaptable for use in a nuclear reactor having a liquid moderator. A reactor of this type is described in the patent to Fermi and Szilard, No. 2,708,656. In cases where reactors of this type generate large amounts of power, the liquid moderator may also serve as a coolant medium.

It is by now general knowledge that nuclear reactors generate large amounts of heat. In order to have a useful reactor capable of being operated safely and continuously it is necessary to transfer the heat from the place where it is generated. The fuel element containing fissionable material is the basic unit which furnishes heat in a nuclear reactor. Each individual element must be constructed to avoid extreme conditions of mechanical stress and yet to withstand high temperatures. In order that it may transfer a large amount of heat it must have a large surface area and must have a low resistance to coolant flow. Also, the design of a fuel lattice or assembly must allow for dimensional changes which occur during reactor operations, i.e., the fuel elements must be free to expand or contract in a flexible manner due to fission and radiation effects.

As a structure the fuel element must be simple and economical to fabricate and it must be constructed to withstand the mechanical loads imposed upon it. It must also be easily replaceable in the reactor. In order to avoid handling large numbers of individual fuel elements they should be adapted to be formed into an assembly or lattice which is flexible enough to withstand radiation damage which often causes severe distortions.

Accordingly, it is a general object of the invention to provide an improved fuel element for a nuclear reactor.

A particular object of the invention is to provide an improved fuel element for a nuclear reactor which is designed and constructed to mitigate the effects of fission and radiation damage.

Another object of the invention is to provide an improved fuel element for a nuclear reactor of improved dimensional stability.

Another object is to provide a fuel element having a high heat transfer coefficient and capable of being accurately positioned in a nuclear reactor.

Still another object of the invention is to provide a reactive assembly of said fuel elements in the form of a lattice wherein dimensional changes in any of the individual fuel elements is permissible without substantially altering the configuration of the lattice.

With these and other objects in mind the invention relates to the reactive portion of a nuclear reactor, said reactive portion comprising a plurality of rod-like bodies of a fissionable material, each encased in a fluid-tight jacket, a plurality of spaced longitudinal fins on the exterior of and extending radially from each jacket, a portion of said fins extending radially beyond the remainder of said fins, and at least one collar mounted on said extended fins for spacing said bodies with relation to each other wherein the collar is constructed and arranged to abut a collar on an adjacent body, and wherein said jacket, fins and collar are formed of a non-fissioning material. An assembly of fuel elements in the form of a lattice constitues what may be termed the reactive portion of the reactor.

This invention will be more fully understood when considered in conjunction with the accompanying illustrative drawings in which:

Figure 1 is an elevational view mainly in cross section of the improved fuel element and a suspension means in accordance with the invention.

Figure 2 is a plan view of the fuel element of Figure 1.

Figure 3 is a perspective view of a fuel rod assembly showing each rod suspended from a suspension grid and positioned laterally by a guide grid and showing the arrangement of the collars on one fuel rod in relation to similar collars on adjacent rods.

Figure 4 is a cross section of Figure 3 taken on the line 2—2.

Referring to Figure 1 the fuel element comprises an elongated rod 10 containing fissionable material such as a fissionable isotope of uranium. If the fuel is uranium, for example, it may be in the form of a rod about 10 feet long and of the order of 2 centimeters in diameter. The ends of the rod are turned down and screw threaded for attachment to threaded upper and lower aluminum fittings or thimbles 12 and 14 respectively. The thimbles 12 and 14 are of the same outside diameter as the rod 10 and have tapped holes for attachment to the rod. Tapered surfaces are provided at the ends of the rod 10 and thimble ends so that they assemble in close alignment to form a smooth continuous outer surface. A thin aluminum jacket 16, for example, of the order of 50 mils in thickness, is drawn down on the uranium rod in thermal contact therewith and sealed to the thimbles 12 and 14 such as by edge welding. Thus, the jacket and thimbles completely enclose the uranium rod in an aluminum system preventing fission fragments from entering the coolant stream and preventing air and/or coolant from coming into contact with the uranium.

At their outer ends, each of the fittings 12 and 14 is bored and threaded to receive a stud. At the upper end of the fuel element a suspension stud 18 is threaded into the fitting 12. The suspension stud has an enlarged portion 20 which bears against a lock washer 22 and an extended reduced portion 23 which is provided with an alignment key 24 for positioning the fuel element radially in an assembly later to be described. The distal end of the reduced portion 23 is also threaded for engagement with a suspension nut.

At the lower end of the fuel element a guide stud 26 is threaded into the fitting 14 against a lock washer 28. The guide stud 26 has an elongated reduced portion 30 slidable in a guide grid 50 to aid in maintaining the position of the fuel element in the assembly. Stud 26 is threaded into aluminum thimble 14 until the stud shoulder bears tightly against lock washer 28.

The jacket, thimbles, fins and studs are all formed from nonfissionable materials having a low capture cross section for neutrons, and must be corrosion resistant under reactor operating conditions. Metals having these characteristics are aluminum, zirconium and stainless steel. I prefer to form the jacket and ribs of aluminum because it has the additional advantage of being an excellent heat conductor. Where the fuel rods are subjected to temperatures substantially over 300° C. the use of a zirconium jacket is preferred. The thimbles and studs are made of stainless steel to meet the added requirement of high strength and, even though stainless steel has a relatively high capture cross section for neutrons, these fittings may be outside the active volume of the reactor.

The jacket 16 is made from extruded aluminum finned tubing, the fins extending axially from, and at intervals around, the rod 10. As shown in Figures 2 and 4, a number of fins 32 are extended radially beyond the remaining fins 34. The extended fins serve as support ribs for spacer collars 36 while the remaining fins serve to limit any deflection of the collars, thus insuring that a collar cannot collapse to the extent that it bears against a jacket 16. Such a situation would cause the formation of local hot spots possibly leading to rupture of the jackets 16. At the same time the difference in height between the fins allows for localized swelling of the rod beneath a collar due to radiation effects which distort the uranium crystal lattice. In the event of any major distortion of individual fuel rods, the spacer collars can partially collapse, thus permitting lateral movement. The short fins 34, however, limit the extent of the spacer collar collapse, thereby insuring a continuous though reduced flow of coolant.

As an example, the fins may have these dimensions:

| Fin | Large | Small |
| --- | --- | --- |
| Number | 6 | 12 |
| Height, inch | 0.157 | .080 |
| Base, inch | .040 | .030 |
| Tip, inch | .020 | .020 |

For a jacketed fuel element 10 feet long, three collars 36, .035 inch thick and 3 to 5 inches long may be used.

Each collar 36 is formed of aluminum tubing and provides intermediate lateral support and spacing for the suspended fuel elements. The aluminum collars are slipped over the extended fins 32 of the jacket and are fastened to them, such as by tack welding. As shown in Figure 3, the edges 41 of the collars 36 are preferably scalloped between the extended fins 32 so that the collar edges cannot catch or tear during fuel rod handling operations. Also, the scalloped edges 41 provide a minimal frictional surface thus serving to reduce the coolant pressure drop through the fuel assembly.

In the fuel rod assembly which is shown in Figure 3, each fuel element is suspended from a suspension grid 40 and supported by a guide grid 50. The suspension grid 40 consists of a series of generally cylindrical bushings 45 interconnected by relatively thin ribs 54. The grid 40 is joined to a flanged bearing plate 56 by a series of stiffening rods 58 extending from the ribs 54. The bearing plate 56 is pinned and bolted at its flanged portion to a supporting I-beam 60 which, in turn, rests upon supports (not shown) at opposite sides of the reactor vessel. The bushings 45 in the suspension grid 40 are slightly smaller in diameter than the jacketed fuel elements 10 so that the coolant flow area through the grid approximates that through the fuel element lattice. The holes through the bushings 45 are flared outwardly toward the fuel elements at an acute angle to the axis. The flared holes in the bushings 45 provide flexible connections for the upper ends of the fuel elements thereby protecting the suspension studs 18 from being bent or misaligned by flexing of the fuel rods. The bottom ends of the bushings 45 have slots 44 to register with the annular alignment keys 24 on the suspension stud 18 of the fuel rod.

The guide grid is similar to the suspension grid and consists of a series of generally cylindrical bushings such as at 47 interconnected by thin ribs such as at 62. The guide grid 50 is joined to a flanged bearing plate 64 by stiffening rods 59 extending from the ribs 62. As in the suspension grid the bearing plate 64 is bolted to a supporting I-beam 66 which, in turn, is mounted across the reactor vessel.

In the fuel rod assembly shown in Figure 3 the extended portion 23 of the suspension stud 18 projects up through the hole in the bushings 45 of the suspension grid 40 and is threaded near its end to receive a suspension nut 42 and beyond this is turned down to provide a seat 52 for the nut 42 (see Figure 1). The stud 18 is provided with a radial alignment key 24 which fits a corresponding slot 44 in the bottom of the suspension grid bushing 45 to establish the angular position of the fuel elements. The alignment key 24 on each fuel rod suspension stud registers with the slots in the suspension grid bushings to keep the extended fins on each jacket radially aligned so that a collar on an adjacent rod will contact along lines about midway between the extended fins. This arrangement allows the collars to flex freely and therefore provides a structurally compact lattice which is flexible enough to accommodate differential thermal expansion and rod misalignment. At the same time since this construction permits slipping between collars on adjacent rods, the rods may undergo individual length changes without restraint.

The guide grid keeps the bottom ends of the rods properly located, permitting them to change length independently. The guide bushings 47 act as sleeves in which the extended stem 30 of the guide pin studs 26 are located. As in the upper bushings the holes in the lower bushings flare outwardly and downwardly from the axis of the hole so that the guide studs will not bend with misalignment of the fuel rods. Each fuel rod is mounted in the assembly with a portion of the guide pin stud 30 extending down through the bushings 47. By this arrangement occasional lengthening or shortening of an individual fuel element, which causes one or more of the spacer collars to come out of register with an abutting collar, may be tolerated without substantially altering the lattice configuration and fuel element spacing.

It will now be appreciated that the fuel element of the present invention possesses a number of important advantages. During operation of the reactor the fuel elements tend to be distorted due to the radiation fields and thereby become deflected from their original positions. In the initial assembly, the collars 36 of each fuel element abut similar collars on adjacent fuel elements and thereby accurately position each fuel element with respect to each other. The extended fins 32 serve as support ribs for the spacer collars 36 while the smaller fins 34 act as collar deflection limit ribs which prevent the collar from collapsing to the extent that local hot spots are created on the surface of the fuel element to cause jacket rupture. The difference in height between the fins 32 and 34 allows for local swelling of the rod due to radiation effects on the fissionable material. By this arrangement the collars may be deformed but the shorter fins 34 limit the deformation and thus prevent contact between the individual fuel elements. In this way cooling channels are provided between each fuel element thus permitting efficient heat transfer from the fuel rods to the coolant material. Also, the spacing of the fuel lattice is conveniently maintained by the spacer collars bearing against each other in close packed relationship. The spacer collars also provide intermediate support at points along the length of the fuel elements to stabilize them against vibration. This intermediate support also accommodates fuel rod swelling and differential expansion between the fuel lattice and the surrounding reactor structure. Swelling of the rods will merely stretch and deform the collars without seriously altering the coolant flow passage or changing the fuel lattice spacing. Of course, the fins greatly increase the heat transfer surface of the individual fuel elements.

Finally, the flexible manner in which rod ends are connected to the support and guide units in the fuel rod assembly prevents overstressing due to misalignment or deflection of the rod.

Since many embodiments might be made of the present invention and since many changes might be made in the embodiment described, it is to be understood that the foregoing description is to be interpreted as illustrative only and not in a limiting sense.

I claim:

1. In a neutronic reactor having a reactive portion with a coolant flowing therethrough, the improvement comprising a plurality of rod-like bodies of a fissionable material, each encased in a fluid-tight jacket, a first set of spaced longitudinal fins on the exterior of and extending radially from said jackets and a second set of spaced longitudinal fins extended radially beyond said first set of fins and at least one tubular collar mounted on and circling said extended fins extending over a relatively small portion of the length of each body and wherein the extended fins on each jacket are aligned so that the collars on adjacent bodies are in contact along lines intermediate said extended fins, said collar bearing against a corresponding collar on an adjacent body, said jacket, fins and collar being formed of a non-fissionable material, said coolant flowing between said bodies.

2. In a reactive core assembly for a nuclear reactor, the improvement which comprises a plurality of cylindrical bodies of a fissionable material, each of said bodies encased in a fluid-tight jacket, spaced longitudinal fins mounted on the outer surface of each said jacket, a portion of said fins extending radially beyond the remainder of said fins and at least one tubular collar extending for a relatively small portion of the length of said bodies mounted on said extended fins arranged to abut similar collars on adjacent bodies, said remainder of said fins serving to limit any collapse of said collar so as not to block flow of fluid around said jacket, means for suspending each said body in close alignment to each other to form a reactive core assembly and guide means on the lower end of said assembly to maintain the lateral position of the lower ends of each of said bodies.

3. The reactive core assembly according to claim 2 wherein the extended fins on each jacket are aligned so that the collars on adjacent bodies are in contact along lines intermediate said extended fins.

4. The reactive core assembly according to claim 2 in which the edges of each collar are scalloped.

5. A reactive core assembly for a neutronic reactor comprising a plurality of cylindrical bodies of a fissionable material, each encased in a fluid-tight jacket, longitudinal, spaced fins mounted on the exterior of and extending radially from said jackets, means at one end of each of said bodies for suspending said bodies to form a lattice, means at the lower end of said bodies for maintaining the lateral position of the lower ends of said bodies and a plurality of collars spaced at intervals along the length of each cylindrical body attached to said fins for abutting arrangement with similar collars on adjacent bodies to form a relatively rigid reactor core structure of great dimensional stability.

References Cited in the file of this patent

UNITED STATES PATENTS

| | | |
|---|---|---|
| 813,918 | Schmitz | Feb. 27, 1906 |
| 1,838,105 | Pherray | Dec. 29, 1931 |
| 2,322,341 | Booth | June 22, 1943 |
| 2,790,760 | Powell | Apr. 30, 1957 |
| 2,841,545 | Zinn | July 1, 1958 |
| 2,848,404 | Treshow | Aug. 19, 1958 |
| 2,898,280 | Schultz | Aug. 4, 1959 |

OTHER REFERENCES

International Conference Peaceful Uses of Atomic Energy, United Nations N.Y., 1956, pp. 221–230, copy in Lib. vol. 9.

TID–7529 (Pt. 1), Reactor Heat Transfer Conf. of 1956, Conf. held Nov. 1, 2, 1956, pp. 249–254. Copy in Library.

Research Reactors, TID–5275, Oct. 10, 1955, pages 166–171. Copy in Library.